United States Patent [19]
Hotta et al.

[11] Patent Number: 5,177,388
[45] Date of Patent: Jan. 5, 1993

[54] TANDEM TYPE ALTERNATOR

[75] Inventors: Toshiaki Hotta, Chiryu; Keiichiro Banzai, Toyota, both of Japan

[73] Assignee: Nippondenso Co., Ltd., Kariya, Japan

[21] Appl. No.: 702,908

[22] Filed: May 21, 1991

[30] Foreign Application Priority Data

May 23, 1990 [JP] Japan .................... 2-133488

[51] Int. Cl.[5] .............. H02K 16/00; H02K 9/00; H02K 9/06; H02K 9/02
[52] U.S. Cl. ............................ 310/114; 310/58; 310/62
[58] Field of Search ............ 310/58, 62, 63, 59, 310/68 D, 112, 114, 118, 126, 263; 322/29, 32, 58

[56] References Cited

U.S. PATENT DOCUMENTS

| | | | |
|---|---|---|---|
| 1,692,371 | 11/1928 | Froesch | 310/59 |
| 2,006,172 | 6/1935 | Klappauf | 310/112 |
| 2,454,120 | 11/1948 | Atwell et al. | 310/59 |
| 3,459,980 | 8/1969 | Coroller | 310/114 |
| 3,535,572 | 10/1970 | DeRugeris | 310/168 |
| 3,610,979 | 10/1971 | Thomas | 310/263 |
| 4,755,698 | 7/1988 | Frister et al. | 310/51 |
| 4,780,659 | 10/1988 | Bansal et al. | 322/58 |
| 4,954,734 | 9/1990 | Iguchi et al. | 310/68 D |

FOREIGN PATENT DOCUMENTS

| | | | |
|---|---|---|---|
| 55-163784 | 11/1980 | Japan . | |
| 61-58869 | 4/1986 | Japan . | |
| 61-162262 | 10/1986 | Japan . | |
| 0714430 | 8/1954 | United Kingdom | 310/191 |

Primary Examiner—Steven L. Stephan
Assistant Examiner—Clayton E. LaBalle
Attorney, Agent, or Firm—Cushman, Darby & Cushman

[57] ABSTRACT

A tandem type alternator comprises a rotor rotatably supported inside a housing and having rotor cores having magnetic poles formed on outer peripheral portions of the rotor cores, respectively, and a plurality of stators arranged on an inside wall of the housing and in tandem in the direction of the axis of rotation of the rotor and having tooth-shaped stator cores which are positioned to be opposite to the magnetic poles of the rotor cores and on which multi-phase windings are wound, respectively. The stators have respectively the multi-phase windings wound thereon so that both multi-phase windings are shifted from each other in the direction of the axis of rotation of the rotor. The housing has ventilation window portions formed between and near the plurality of stators which provide communication between the interior and exterior of the housing, so that ventilation resistance within the housing is reduced and the cooling effect is increased.

7 Claims, 4 Drawing Sheets

TANDEM TYPE ALTERNATOR

BACKGROUND OF THE INVENTION

The present invention relates to a tandem type alternator for a vehicle.

An alternator for a vehicle includes a compact tandem type alternator having a plurality of sets of stators and rotors in order to meet an increasing power demand and to improve mountability on a vehicle.

In the tandem type alternator for a vehicle, a plurality of rotors are arranged in tandem along a rotational shaft and stators are arranged outside the rotors to surround the rotors, and the rotors and the stators are accommodated in a housing.

Ventilation holes for passing therethrough external air are formed in the housing at the axially opposite end walls thereof. As the rotors rotate, an air flow from the ventilation holes in one end wall to those in the other end wall is generated by vanes attached to the rotors and by vanes mounted on the rotational shaft outside the housing so that cooling of the interior of the housing may be attained.

However, in the tandem type alternator for a vehicle, since the plurality of sets of stators and rotors are arranged axially in tandem, axial ventilation resistance is increased and it is difficult to have sufficient air flow produced. Further, since the tandem type is intended to attain miniaturization, it is impossible to provide a sufficient gap between stator windings wound on adjacent stators.

As a result, it becomes difficult to sufficiently dissipate heat generated in the stator windings within the housing to the outside of the housing. Particularly, during the summer season, for example when atmospheric temperature is high, heat is apt to stay within the housing, so that it becomes difficult to achieve sufficient power generating capability in spite of the circumstances where particularly high power consumption is needed.

SUMMARY OF THE INVENTION

It is an object of the present invention to improve cooling performance of a tandem type alternator for a vehicle without causing its size to be increased.

The present invention provides an alternator which comprises a rotor rotatably supported in a housing and having a plurality of magnetic poles disposed on outer peripheries thereof, and a plurality of stators arranged in tandem axially of the rotor in the housing which stators have multi-phase windings and tooth-shaped cores positioned to be opposite to the magnetic poles of the rotors, respectively. The multi-phase windings wound on the stators, respectively, are staggered with respect to each other in the rotational direction of the rotor. Further, ventilation windows for communicating the interior and the exterior of the housing are formed in the housing between the stators.

In the present invention, the multi-phase windings of the stators arranged in tandem axially of the rotor are staggered with respect to each other in the rotational direction of the rotor. Accordingly, where the stators are arranged in the housing at the same space interval as that of the prior art, the outermost peripheral portions of the multi-phase windings wound on the tooth-shaped core of one of the stators are staggered in the rotational direction with respect to the outermost peripheral portions of the multi-phase windings of an adjacent one of the stators, and hence it is hard for the multi-phase windings of both stators to come into contact with each other. As a result, spaces extending in the rotational direction are formed between the stators.

Further, since the ventilation windows are disposed in the portions of the housing outside the stators and near the spaces formed between the stators, the spaces formed between the stators and the exterior of the housing communicate each other.

By virtue of this structure, when the rotor is driven to rotate, an air flow generated inside and outside the housing by the vanes disposed at various portions of the alternator easily moves inside and outside the housing passing through the ventilation windows, thereby cooling the interior of the housing.

According to the present invention, since intermediate portions between the stators, which are arranged in tandem in the housing, are cooled, it is difficult to reduce the electric generating capability, and a sufficiently large electric generating capability can be obtained with an alternator for a vehicle having a limited size in itself.

DESCRIPTION OF THE PREFERRED EMBODIMENT

The alternator for a vehicle according to the present invention will be explained with reference to an embodiment of the present invention.

Figure 1:
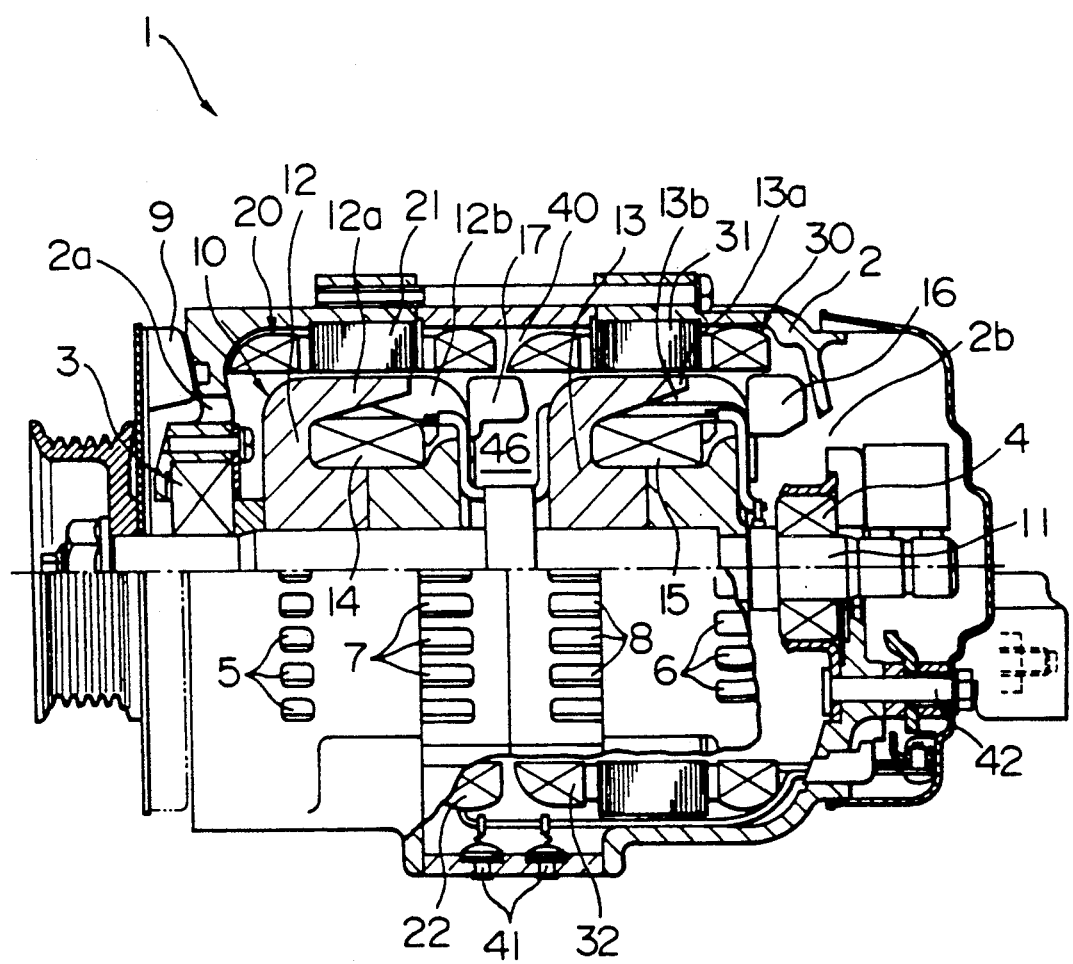
FIG. 1 is a sectional drawing showing an alternator in accordance with one embodiment of the present invention.

A tandem type alternator 1 of this embodiment shown in FIG. 1 has a rotor 10 rotatably supported within a substantially cylindrical housing 2 by bearings 3 and 4 mounted in the housing 2 and two substantially cylindrical stators 20 and 30 arranged outside the rotor 10 surrounding it.

In the left and right end walls of the housing 2, ventilation openings 2a and 2b for providing communication between the interior and the exterior of the housing 2 are formed, and two hole trains 5 and 6, each of which hole trains includes a plurality of ventilation holes, are provided in a cylindrical side wall of the housing 2 to make the rotor 10 intervene between the positions of the two hole trains.

The rotor 10 comprises two rotor cores 12 and 13 having a rotational shaft 11, which is driven by an engine through a belt (not shown), fitted therein and rotor coils 14 and 15, which function as field coils, wound on the two rotor cores 12 and 13, respectively. Six pairs of positive and negative claw magnetic poles 12a, 12b; 13a and 13b formed integrally with each of the rotor cores 12 and 13 are disposed on the outer periphery of each of the rotor cores 12 and 13 so that positive claw magnetic poles and negative claw magnetic poles are arranged alternately on the outer periphery of the rotor 10.

The rotor cores 12 and 13 are arranged to have parallel displacement with each other in the direction of the rotational shaft 11 so that the magnetic poles 12a and the magnetic poles 13a, and the magnetic poles 12b and the magnetic poles 13b are oriented in the same radial direction, respectively.

An inclined flow fan 16 for producing an air flow is provided at a right end portion of the rotor core 13 of the rotor 10. As the rotor 10 is rotated, an air flow from the right to the left in the direction of the rotational shaft 11 is produced to pass through the space between the magnetic poles 13a and 13b of the rotor core 13.

A centrifugal fan 17 is disposed at the right end portion of the rotor core 12.

On the other hand, the stators 20 and 30 respectively have substantially cylindrical stator cores 21 and 31 which have been formed by bending a core plate having slot portions punched out to form a laminated roll, with tooth-shaped iron cores being formed between the slots of the stator cores 21 and 31, respectively, and stator coils 22 and 32 wound being inserted in the slots.

In the present embodiment, in order for three-phase alternating currents to be generated by the twelve magnetic poles of each of the rotor cores 12 and 13 of the rotor 10, 36 slots and 36 tooth-shaped iron cores are formed in each of the stator cores 21 and 31, and the three-phase stator coils 22 and 32 are inserted in the slots of each of the stator cores 21 and 31.

Figure 2:
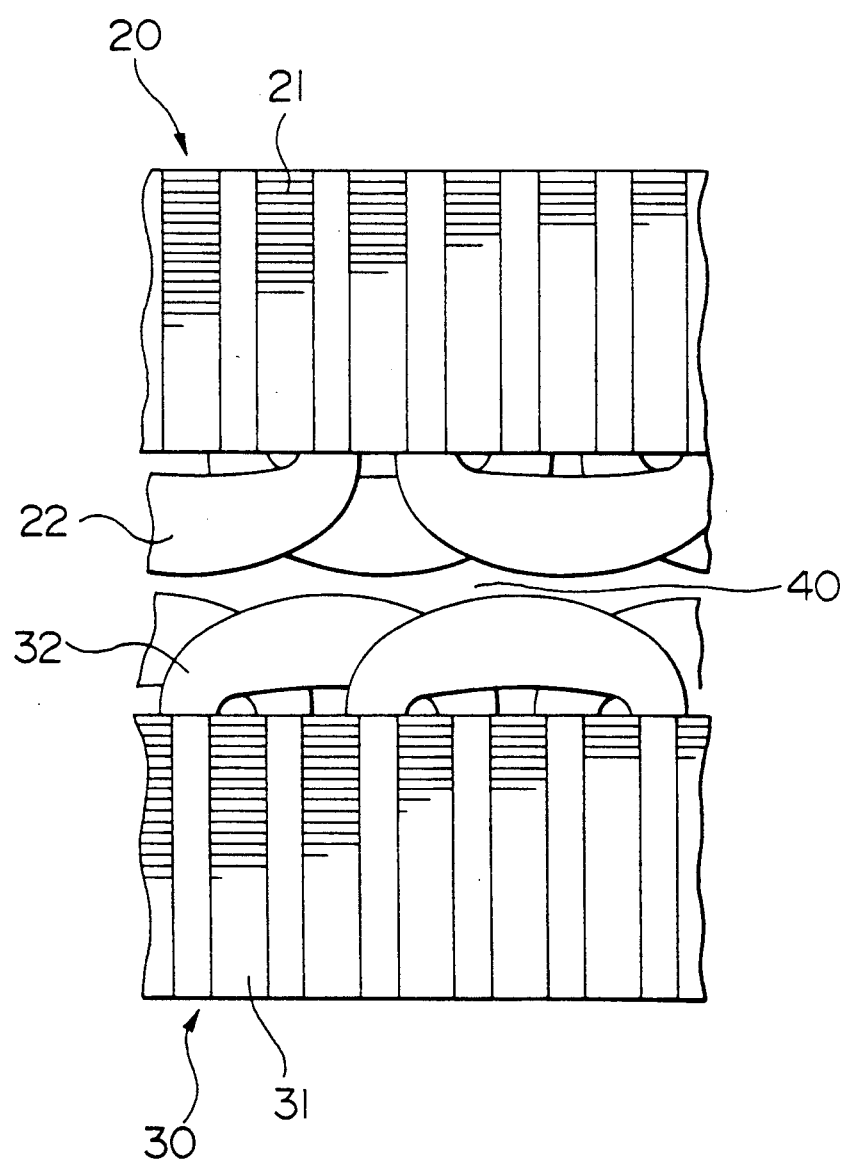
FIG. 2 is a development drawing showing a development of the stators of the alternator in accordance with the embodiment of the present invention.

The arrangements of the stator coils 22 and 32 on the stator cores 21 and 31 of the stators 20 and 30, respectively, are not identical with each other, but they are shifted in position or displaced from each other by a predetermined angle around the rotational shaft 11. As a result, it becomes possible to prevent a neighboring coil in the stator coils 22 and that in the stator coils 32 from coming into contact with other, and a continuous space 40 is formed between the stator coils 22 and the stator coils 32 in the peripheral direction, as shown in FIG. 2.

In order to have an appropriate distance between the stator coils 22 and 32 provided in the space 40 and to reduce a ripple content in a DC output voltage obtained by rectifying an AC output voltage, the stators 20 and 30 are shifted in position by a relative angle of 5 degrees around the rotational shaft 11 so that a phase difference of electrical angle 30 degrees may be obtained between three-phase output voltages generated by the stator coils 22 and 32, respectively.

On the other hand, ventilation opening trains 7 and 8, which provide communication between the interior and the exterior of the housing 2, are formed in the portions of the cylindrical side wall of the housing 2 which are positioned outside of the stator coils 22 and 32 and near the space 40.

An external fan 9 fixed to the rotational shaft 11 to produce a leftward air flow through the inner side of the housing 2 is arranged outside of the left end portion of the housing 2.

Figure 3:
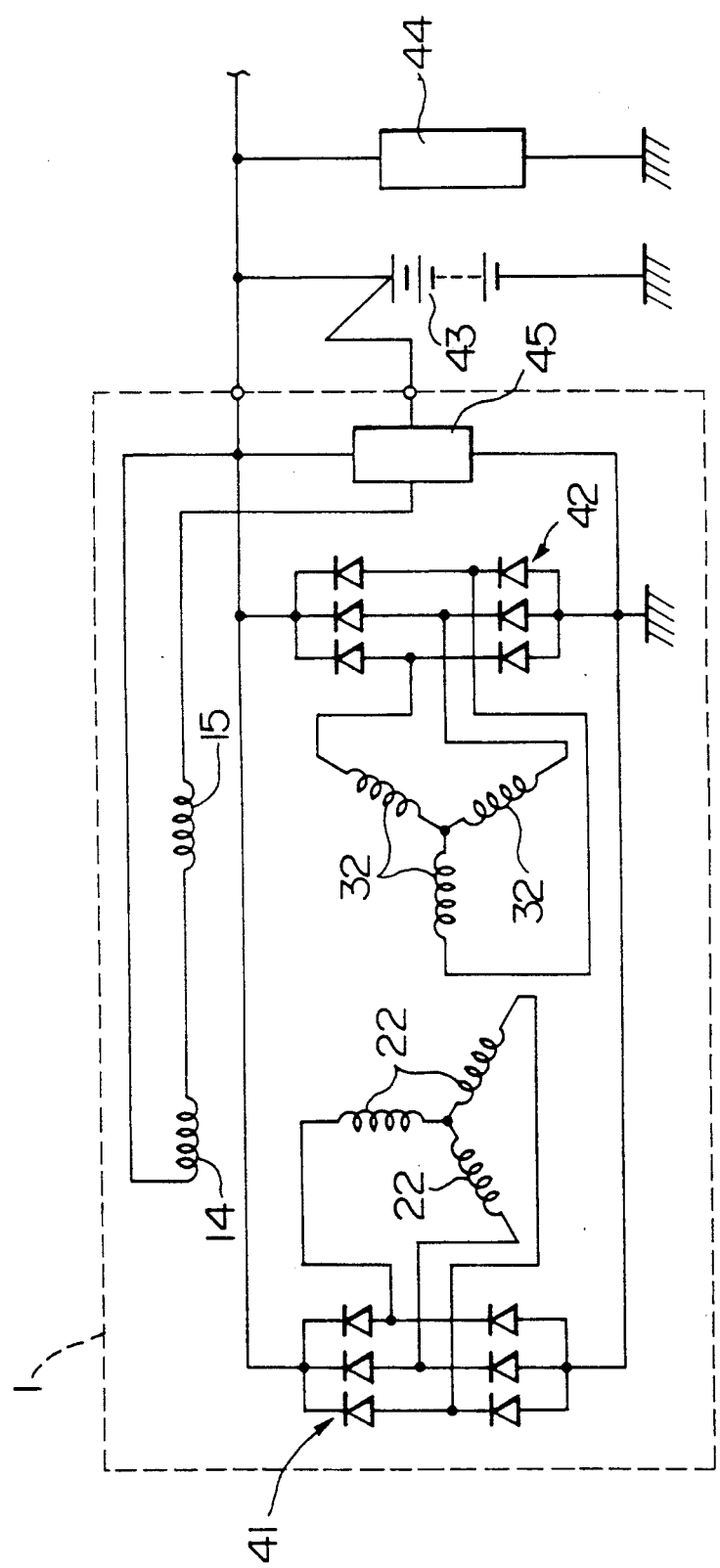
FIG. 3 is a circuit diagram showing a power supply circuit for a vehicle which uses the alternator in accordance with the embodiment of the present invention.

In the alternator 1 of this embodiment constructed as described above, the stator coils 22 and 32 are Y-connected, respectively, as shown in FIG. 3, and the three-phase AC outputs thereof are subjected to three-phase full-wave rectification through rectifiers 41 and 42 composed of six diodes, respectively, and the rectified outputs therefrom are supplied to a vehicle battery 43 and a vehicle load 44, and further the rectified outputs are supplied to a voltage regulator 45 which controls energization of the rotor coils 14 and 15 in response to a terminal voltage of the vehicle battery 43 to maintain the terminal voltage of the vehicle battery 43 at a constant value.

As the rotor 10 is driven by the engine when the engine has started rotation, the alternator 1 generates electric power in accordance with the vehicle load 44.

Figure 4:
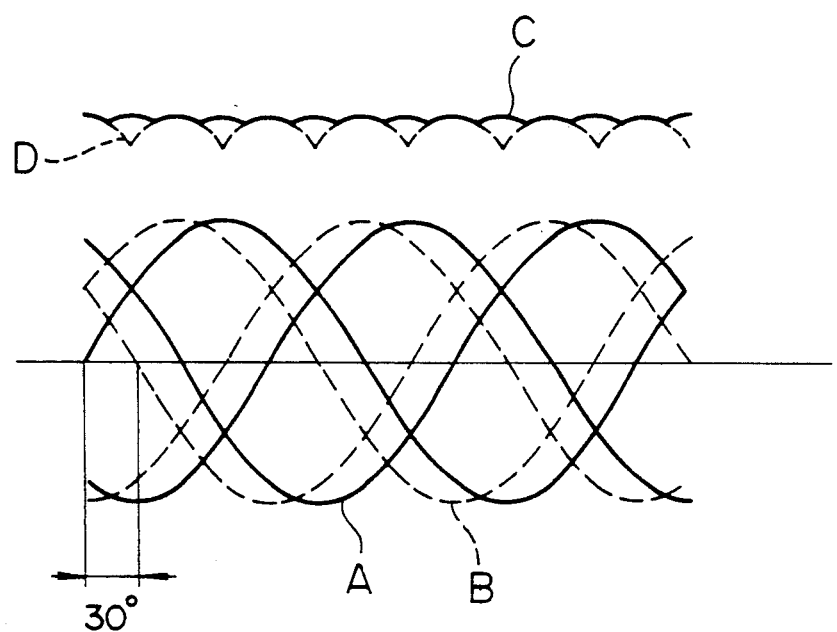
FIG. 4 is a waveform diagram showing an output voltage waveform of the alternator in accordance with the embodiment of the present invention.

Since the output voltage of the stator coil 32 has a phase difference of 30 degrees in electrical angle as compared with that of the stator coil 22, the output voltage waveforms of the stator coil 22 and the stator coil 32 become as shown by a solid line A and a broken line B in FIG. 4, respectively, and, after the output voltages thereof have been subjected to three-phase full-wave rectification through the rectifiers 41 and 42, respectively, a resultant combination of the rectified output voltages has a waveform as shown by a solid line C in FIG. 4.

Comparing the combined DC voltage waveform with a sole DC voltage waveform shown by a broken line D in FIG. 4 which is obtained by rectifying only the output voltage of the stator coil 22, it can be seen that a difference between a peak voltage and a minimum voltage is reduced and a ripple factor is decreased.

On the other hand, as the rotor 10 rotates, air streams are produced by the inclined flow fan 16, the centrifugal fan 17 and the external fan 9, respectively, and air sucked into the housing 2 through the ventilation opening 2b cools the rotor core 13, while passing through the clearance of the rotor core 13, and flows into the space 46 between the rotor cores 12 and 13. The centrifugal fan 17 discharges a portion of the air in the space 46 to the outside of the housing 2 through the ventilation window trains 7 and 8.

As a result, the stator coils 22 and 32 are cooled and heat generated in the coils 22 and 32 is discharged to the outside of the housing 2.

The remaining air in the space 46 passes through the clearance of the rotor core 12 to cool the rotor core 12, and then it is sucked out of the housing 2 through the ventilation opening 2a by the external fan 9.

In the embodiment described above, since the stators 20 and 30 are shifted in position with respect to each other by 5 degrees in the direction of rotation, the space 40 is formed between the stator coils 22 and 32, and further the ventilation window trains 7 and 8 are formed in the portions of the housing 2 near and between the stators 20 and 30. By virtue of this structure, a portion of the air sucked into the housing 2 through the ventilation opening 2b is discharged outward of the housing 2 through the ventilation window trains 7 and 8, so that it is possible to provide improved cooling effect.

Accordingly, sufficient electric power generating capability is attained without increasing the size of the alternator 1.

Further, since the ventilation resistance in the housing 2 is reduced by the provision of the ventilation window trains 7 and 8, the interference of the air passing through the housing 2 is suppressed, whereby a windage noise can be reduced.

In the present embodiment, since the phase difference of 30 degrees in electrical angle between the stator coils 22 and 32 is provided, the ripple of the rectified output voltage is decreased and a high quality DC output having a reduced voltage variation can be obtained.

In the present embodiment, an inclined flow fan 16, a centrifugal fan 17 and an external fan 9 are used. However, even if the inclined flow fan 16 or the centrifugal fan 17 is not used, necessary air flow can be produced by the rotation of the rotor cores 12 and 13, so that it is possible to obtain the cooling effect.

In the case where the capability of the external fan 9 is large enough to cause external air to be sucked into the housing 2 through the ventilation window trains 7 and 8, since the space 40 is communicating with the ventilation opening 2a with sufficient breadth to thereby reduce the ventilation resistance, it is possible to obtain a sufficient cooling effect.

In addition, the connection of each of the stator coils is not restricted to Y-connection but it may be Δ-connection.

We claim:

1. An alternator comprising:
   a plurality of rotors rotatably supported in a housing, each of said rotors having a plurality of magnetic poles disposed on respective outer peripheries thereof;
   a plurality of stators, each of said stators being disposed respectively corresponding to each of said rotors and arranged in tandem in an axial direction of said rotors in said housing, each of said stators having a multi-phase winding wound thereon and having, inside thereof, a tooth-shaped core positioned opposite to said magnetic poles, said multi-phase windings wound on said stators being shifted in position from each other in a rotational direction of said rotor;
   said housing including ventilation windows located therein between and close to said stators to provide communication between an interior and an exterior of said housing; and
   a cooling fan disposed between adjacent rotors, said cooling fan cooling surfaces of said stators.

2. An alternator according to claim 1 wherein each of said rotors have a first and a second rotor core arranged in tandem in the axial direction of said rotor, a plurality of claw magnetic poles being disposed on outer peripheries of said rotor cores.

3. An alternator according to claim 1, wherein each of said stators includes a stator core having 36 slots, three-phase windings being wound in said slots of each of said stator cores, said stator cores being arranged so that they are shifted from each other by 5 degrees in the rotational direction of said rotor.

4. An alternator according to claim 3, wherein said three-phase windings are Y-connected and are arranged so that they are shifted from each other by $\pi/6$ radian, each of said three-phase windings being connected with independent rectifiers.

5. An alternator according to claim 1, further comprising an external fan disposed outside of said housing and driven by a rotational shaft of said rotor to supply cooling air into said housing.

6. An alternator according to claim 2, wherein said cooling fan comprises a first cooling fan disposed at one end of said first rotor core and a second cooling fan disposed at one end of said second rotor core.

7. A tandem type alternator, comprising:
   a housing for supporting a pair of bearings and having ventilation apertures at both end side walls thereof;
   first and second rotors having a rotational shaft rotatably supported by said bearings, including a pair of rotor cores arranged in tandem on said rotational shaft and having a plurality of claw poles on outer peripheral portions thereof, a first rotor coil and a second rotor coil wound on said pair of rotor cores, respectively;
   first and second stators having first and second stator cores fixed on an inside wall of said housing to surround said first and second rotors, respectively, said first and second stator cores having the same number of slots formed on inside surfaces thereof, a first stator coil and a second stator coil being wound in said slots of said first and second stator cores, respectively, said first and second stator cores being arranged so that they are shifted from each other by a predetermined angle around said rotational shaft; and
   a cooling fan supported by said rotational shaft between said first and second rotors for cooling an interior of said housing and said stators, said housing having a plurality of windows located at portions near a space between opposite end portions of said first and second stator coils.

* * * * *